Aug. 23, 1960 D. T. GEISER 2,950,361

DUPLEX COMMUNICATION

Filed Sept. 1, 1954 2 Sheets-Sheet 1

INVENTOR.
DAVID T. GEISER
BY
Connolly and Hutz
HIS ATTORNEYS

DUPLEX COMMUNICATION

Filed Sept. 1, 1954 2 Sheets-Sheet 2

INVENTOR.
DAVID T. GEISER
BY
Connolly and Hutz
HIS ATTORNEYS

United States Patent Office 2,950,361

Patented Aug. 23, 1960

2,950,361

DUPLEX COMMUNICATION

David T. Geiser, North Adams, Mass., assignor to Sprague Electric Company, North Adams, Mass., a corporation of Massachusetts Filed Sept. 1, 1954, Ser. No. 453,485

4 Claims. (Cl. 179—170)

The present invention relates to duplex communication, that is the simultaneous transmission and reception of messages in the same frequency channel.

Although such simultaneous communication has been suggested many times, it has not been widely adopted because heretofore it was considered to involve excessive transmission losses. In the radio communication field particularly the loss in transmission intensity is a serious difficulty.

Among the objects of the present invention is the provision of a duplex communication system that avoids the above as well as related difficulties.

Additional objects of the present invention include the provision of a novel duplexing station arrangement for use in the above type of system.

The above as well as further advantages of the present invention will be more completely understood from the following description of several of its exemplifications, reference being made to the accompanying drawings wherein.

According to the present invention a highly effective form of duplex communication system has a signal transmitter and signal receiver connected for operation at the same frequency, and a duplexing coupler network connecting a communication line to both the transmitter and the receiver and having a load resistance with a balancing circuit effectively excluding the transmitter's signals from the receiver and directing the received signals from the antenna to the receiver so that both transmitter and receiver can be used simultaneously with that line, the load resistance being at least about three times the mutual series impedance so that the coupling losses are practically restricted to the received signals.

The duplexing coupler network is preferably in the form of a Carey-Foster bridge or a Maxwell bridge. A particularly effective form of duplexing station has a transmitter with one grounded and one ungrounded output lead, a receiver with one grounded and one ungrounded input lead, a communication line with one grounded and one ungrounded lead, the ungrounded transmitter lead being connected through an electrical transformer primary winding to the ungrounded line lead, and being also connected to a phasing capacitor which returns to ground through an artificial line, and a transformer secondary winding having mutual inductance with respect to the transformer primary, connected between the ungrounded receiver lead and the juncture of the phasing capacitor with the artificial line. The operation of this station is improved if a second inductor is connected to the ungrounded receiver lead through a capacitance that offsets the leakage reactance of the transformer secondary. Both such modifications can be used simultaneously to provide optimum operation.

Another desirable form of duplexing station has a transmitter with one grounded and one ungrounded output lead, a communication line with one grounded and one ungrounded lead and a receiver, the ungrounded transmitter lead being connected through an inductor to the ungrounded line lead, and being also connected to an artificial line which returns to ground through a phasing capacitor, and a transformer with a primary connected between the ungrounded line lead and the juncture of the phasing capacitor with the artificial line, and with a secondary connected to the receiver.

Figure 1:
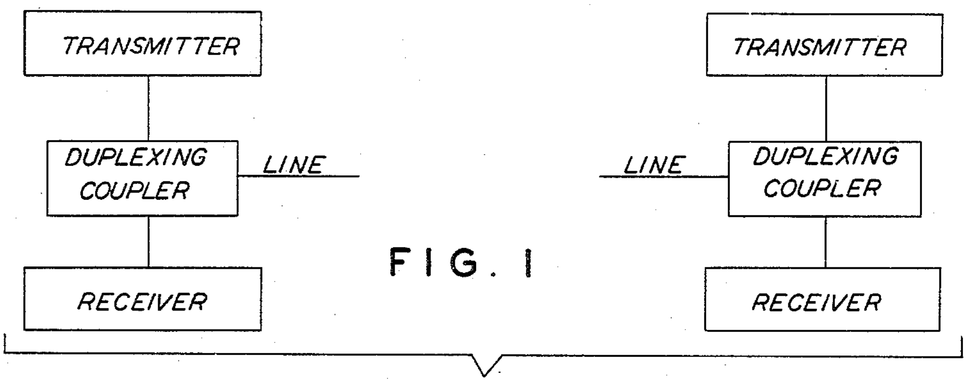
Fig. 1 is a block diagram illustrating the general form of a duplexing communication system.

Referring now to Fig. 1, the general arrangement there shown has two spaced duplexing stations each provided with a transmitter, a receiver, and a duplexing coupler which connects them both to a line. The line can lead to an antenna or can be the antenna itself. Both transmitters and both receivers are arranged to operate in the same frequency channel so that each station can talk to the other station and can listen to the other station at the same time and at the same frequency.

Duplexing couplers suitable for the above use are known and in general involve an artificial (or dummy) line and a balancing circuit arranged so that the received signal is balanced away from the transmitter and the transmitter's output is balanced away from the receiver. The artificial line becomes a dissipating element in these balanced circuits.

Figure 2:
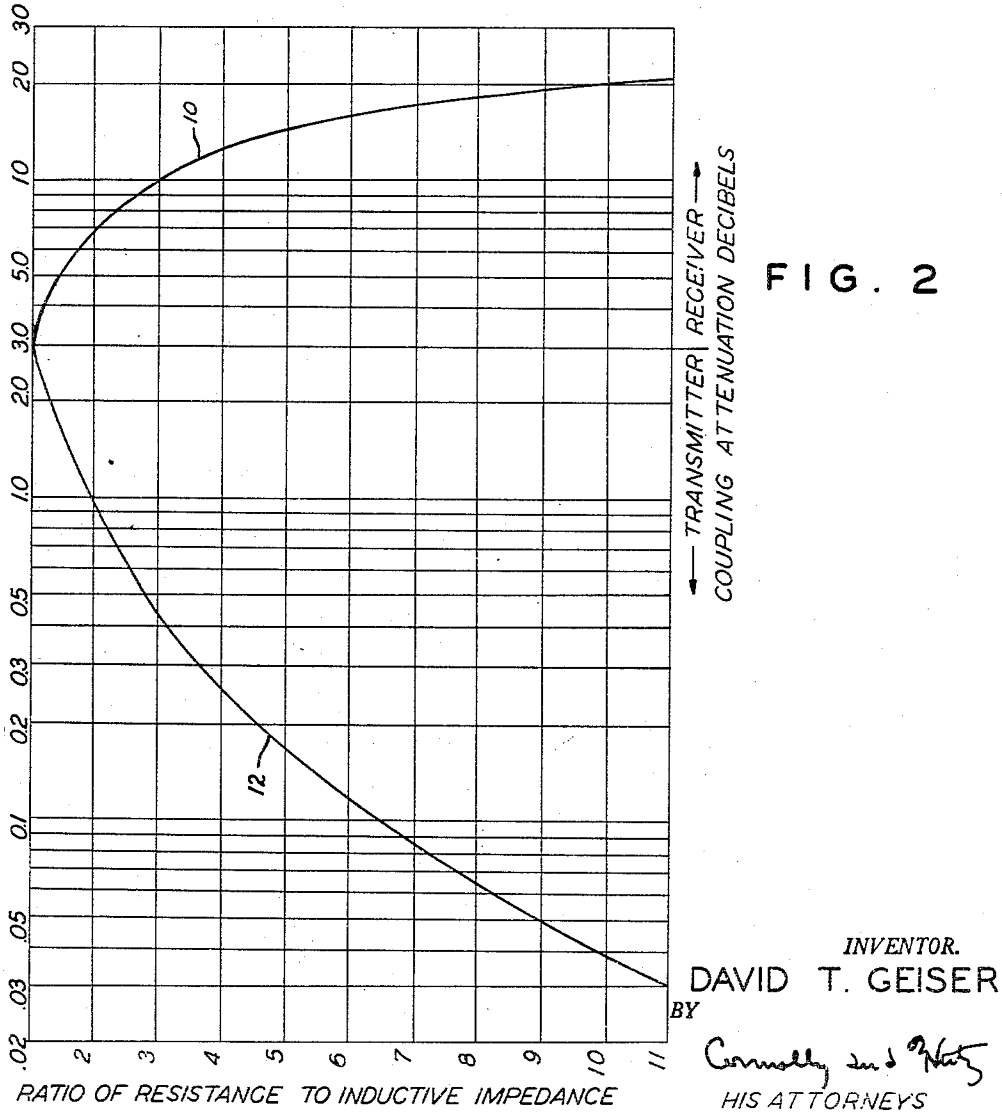
Fig. 2 is a curve diagram indicating a manner in which the duplexing can be provided.

Fig. 2 shows manners in which the balancing can be arranged with such an artificial line in a bridge network of the Carey-Foster type. The diagram represents two seperate curves 10 and 12 showing the coupling attenuation for the receiver and transmitter respectively, with different ratios between the artificial line resistance and the impedance of the primary inductance where the primary inductance equals mutual inductance, and line and dummy resistances are equal. By selecting any one ratio, the attenuation characteristics are fixed as indicated by the points where that ratio intercepts curves 10 and 12.

As the ratio changes from 11 to 1, curve 10 shows that the receiver attenuation drops from somewhat over 20 decibels to 3 decibels. On the other hand the transmitter attenuation under these conditions show a gradual increase from about 0.03 decibel to 3 decibels.

Prior duplexing systems of the above type appear to have all operated at the 3 decibel loss condition with such loss in both the transmitter and the receiver. Accordingly, a transmitter for use with this system had to be twice as powerful as would otherwise be needed for communication on noisy radio channels.

According to the present invention, however, a ratio of 3 or higher is used between the resistance and inductive impedance. This reduces the transmission losses to less than half a decibel so that there is no significant loss in transmitter range. Although the receiver losses are thereby increased to 10 decibels or more, this is no real obstacle, particularly if a receiver of the low noise type is used. Even a 20 decibel receiver loss is not serious, since in most cases the received signal will still have a good signal-to-noise ratio. The noise level being the limiting factor in the readability of the received signals, the use of a low noise receiver, as for example one having triode input stages and/or a triode mixer, usually makes the signals of lowered intensity clearly understandable.

A feature of the present invention is that the low transmission loss greatly reduces the power that has to be dissipated by the duplexing coupler network. This in turn sharply improves ahe stability of the network so that it can be operated on a continuous basis without frequent adjustment to compensate for thermal effects.

Figure 3:
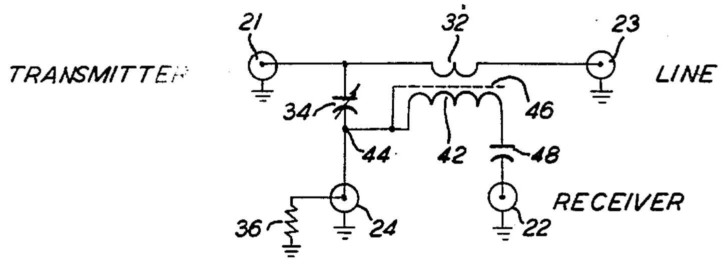
Fig. 3 is a schematic diagram of a duplexing coupler network according to the present invention.

Fig. 3 illustrates a type of duplexing coupler according to the present invention, that will provide 195 decibels of isolation with practically no transmitter attenuation. Four coaxial type terminal connectors 21, 22, 23 and 24 are shown, preferably mounted in feed-through fashion on the walls of a metal container. These are for connection respectively to the transmitter, receiver, signal line and artificial line. All the outer conductors of the connectors are grounded to the container walls.

Between the ungrounded leads of transmitter connector 21 and line connector 23 is linked a balancing inductor 32. A phasing capacitor 34 is connected between the ungrounded leads of the transmitter and artificial line. The artificial line need be only a resistor 36, such as one of the coaxial types as the Bird Electronics Corporation termaline series, plugged into its connector 24 and physically located outside the container. The network can be completed by a second inductor 42 connecting the ungrounded lead of receiver connector 22, with the juncture 44 between capacitor 34 and resistor 36. This juncture is also the ungrounded terminal of connector 24. The second inductor 42 is placed sufficiently close to the balancing inductor 32 to develop appreciable mutual inductance.

Better isolation is obtained when shielding 46 such as a grid of conductor wire, is placed between the two inductors and is connected to the above juncture. This reduces stray electrostatic coupling induced by the inductor configurations. It is also desirable to insert a series capacitor 48 in the connection between inductor 42 and the ungrounded receiver connector lead to offset the leakage reactance of that inductor.

A duplexing arrangement of the above type, used with a signalling frequency of 3.9 megacycles per second, and having a 0.21 microhenry balancing inductor 32, an 8.4 microhenry second inductor 42, a mutual inductance about equal to the balancing inductance, a phasing capacitance 34 adjusted to 79 micro-microfarads, a 200 micro-microfarad offsetting capacitance 48 and a resistance 36 of 51.5 ohms gave about 195 decibels of isolation between the transmitter and receiver each having 51.5 ohm terminal circuits, the antenna also having a 51.5 ohm input.

All the above components, except for the resistance 36, were mounted within the container carrying the connectors. Inductor 32 was 1½ turns of No. 20 single formex insulated copper wire wound over a length of 3/16" on the outside of a cylindrical hollow Bakelite form having a 1½" external diameter, and connected by leads approximately ¾" long. The second inductor 42 was 20 turns of No. 26 single formex insulated copper wire wound on the same form and spaced at one end from the balancing inductor by 3/16". In this spacing four interconnected lengths of the second inductor wire were threaded diametrically through the core at 45 degree intervals. The leads for capacitance 34 were 1 and 2½" long.

The 195 decibel isolation enables simultaneous two-way signalling with a transmitter of up to about 30 or more watts output. Without the shielding 46 about 35 decibels less isolation is attainable.

Figure 4:
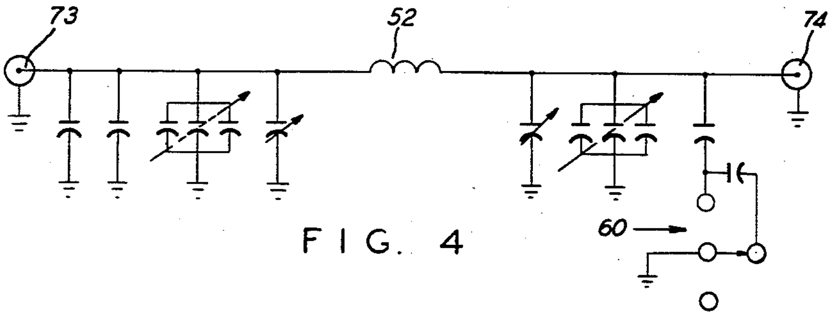
Fig. 4 is a schematic diagram of a matching network that can be employed to simplify the use of a duplexing coupler.

The above type of bridge network is conveniently used with a matching network connected between the line connector 23 and the antenna. Fig. 4 shows such a matching network of the pi-type having a series inductance 52 on either side of which there is a capacitance return to ground. These capacitances are adjustable and are shown as made up of a number of fixed or adjustable capacitances. A multi-position switch as indicated at 60 can be also used to adjust the capacitance.

At each end of the inductor 52 are provided connectors as shown at 73, 74. Connector 73 can be arranged to plug into connector 23 in the bridge construction of Fig. 3, while the connector 74 runs into the antenna, or the antenna tuner where one is used. Adjustments can be made in the matching network so that it is not necessary to reset the coupler bridge during the duplexing communications.

Thus with a bridge having the circuit components as specifically recited above, a matching network with an inductor 52 of 1.4 microhenries and with the input and output capacitances adjustable from about 35 to about 3000 micro-microfarads, the 195 decibel attenuation with an antenna having a 50 ohm line and a two to one voltage standing wave ratio maximum is fairly readily maintained. No provision need be made for cooling the resistor 36. However, for the utmost stability, particularly with very high power transmitters, the heat generated in the resistor can be absorbed as by means of running a stream of constant temperature water through it where it is of the coaxial type, so that its resistance change is minimized and the remainder of the bridge is not affected by its dissipation.

Although the duplexing coupler arrangement is the very heart of the duplexing, there are other important considerations if satisfactory results are to be obtained. Echoes from objects around the antenna present one significant problem. Unless radar-like reflections suffer sufficient propagation path loss to fall below the receiver noise level, they may appear at the receiver as interfering signals. Except under severe doppler conditions, the reflections of the transmitted carrier wave appear as a phase shift in the antenna characteristic and in the course of antenna balance are cancelled. The same does not hold for modulation on the carrier. Only by coincidence will the type of modulation and echo delay be such to afford complete cancellation of echo modulation components. Thus it is important that echo level lie below the received noise level. Nearby echoes will be afforded almost complete cancellation unless the carrier frequency is very low or the modulation frequency very high.

Another consideration is the mechanical stability of the antenna. The use of structures having low mechanical resonant frequencies permits any changes caused by weather-induced antenna vibration for example to be corrected by an automatic tuner. Electrical changes caused by such mechanical effects can be minimized by arranging the voltage peak on the antenna to be as far away as possible from nearby objects. At the same time it is desirable to have the antenna physically symmetrical to minimize resistance changes caused by wind or ice loading. The antenna should be particularly well removed from nearby trees by at least one wave length and preferably as much more as possible.

High resistance antennas are not too desirable where a voice modulation band width is used. For example, with a 3.9 megacycle carrier, an antenna having 5500 ohms of resistance presents a significant unbalance at about 2 kilocycles from the carrier frequency when it is matched to a 51.5 ohms resistance by an L network. However, an antenna resistance of about 500 ohms does not present such unbalance. Wide-band antennas such as discone or rhombic types appear to be highly suited for duplexing of broad-band emission.

It is also preferred to have the station, including the location where the operators are positioned, completely shielded from the antenna, as for example, by a grounded enveloping screen. Without such shielding, movement of an operator may be sufficient to effect an unbalance. Furthermore, in the absence of such shielding the antenna field may be so strong as to seriously degrade the duplexing isolation.

The transmitter used with the duplexing arrangement of the present invention should have its frequency crystal controlled. Without such frequency stability, balance is extremely difficult to maintain. Furthermore, transmitter harmonics should be well suppressed to avoid overloading the receiver or destabilizing the bridge by excessive heating of the dummy resistor. It goes without saying that the transmitter should be well shielded to prevent radiation directly from the transmitter to the receiver. The receiver should also be well shielded.

Figure 5:
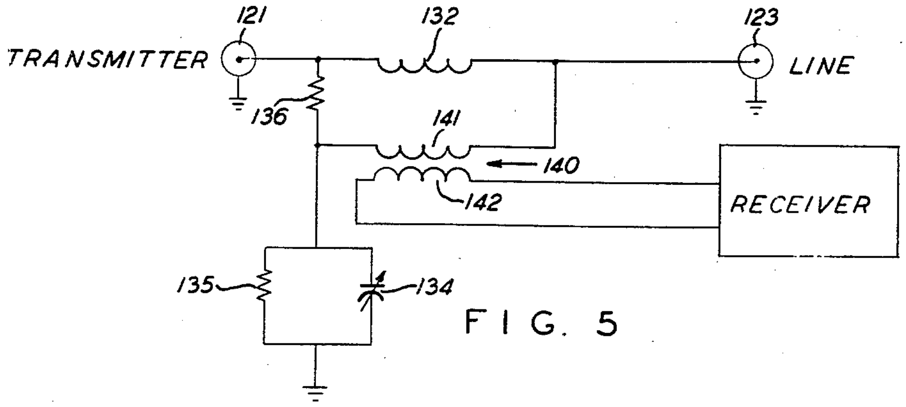
Fig. 5 is a view similar to Fig. 3 of a different form of duplexing coupler network.

Fig. 5 shows a Maxwell bridge type of duplexing coupler network that is also suitable for use in the present invention. This network as illustrated has 2 coaxial connectors 121, 123, for the transmitter and line, respectively. Between the ungrounded leads of these connectors is connected the balancing inductor 132, while from the ungrounded lead of connector 121 a dummy resistor 136 is also connected and returns to ground through a phasing capacitor 134. A fixed or adjustable resistance 135 can parallel the capacitor 134 to help compensate for deviations in the bridge components or antenna impedance. A receiver is connected to the bridge by means of a transformer 140 having a primary 141 connected between the ungrounded lead of connector 123 and the juncture of phasing capacitor 134 with resistor 136. The transformer has a secondary 142 which is connected to the receiver input leads.

The network of Fig. 5 also provides about 195 decibels of isolation with a transmitter and receiver both operating at 3.9 megacycles having terminal impedances of 50 ohms, the line resistance, as well as resistor 136 also being 50 ohms each, parallel resistor 135 being set at 40,000 ohms with capacitor 134 adjusted to 80 micromicrofarads, the balancing inductor 132 being 0.2 micromicrohenry, the transformer primary being 17 micromicrohenries and the secondary being 17 micro-microhenries and having a high coupling coefficient and low stray capacity. If a balanced input receiver is used, its input terminals may be connected to 123 and the junction of 135 and 136, transformer 140, 141, and 142 being omitted.

Instead of having inductors 32 or 132 made of windings, they are usually small enough so that a length of straight or bent conductor will provide all the inductance that is required. About 3 or 4 inches of such conductor for example is all that is needed for the above arrangement. Where another inductance is mutually coupled to the balancing inductance of the latter type, it can merely be wound on a form looped around a portion of the straight conductor, preferably adjacent the transmitter connector.

Conversely the capacitances can be introduced by bringing closely together the circuit portions to be capacitively linked.

Forms of the duplexing bridges having equal resistance antenna and artificial lines are particularly desirable to eliminate bridge input impedance variation with transmitter frequency. In addition, such choice of resistance very greatly simplifies procurement problems involved in component choice. This resistance choice in no way limits the desired apportionment of transmitted and received signal loss.

As many apparently widely different embodiments of this invention may be made without departing from the spirit and scope hereof, it is to be understood that the invention is not limited to the specific embodiments hereof except as defined in the appended claims.

What is claimed is:

1. A duplexing station having a transmitter with one grounded and one ungrounded output lead, a receiver with one grounded and one ungrounded input lead, a communication line with one grounded and one ungrounded lead, the transmitter and the receiver being connected for operation within a single band of frequencies and operable at the same frequency, the ungrounded transmitter lead being connected through a primary balancing inductor to the ungrounded line lead, the ungrounded transmitter lead also being connected to a phasing capacitor which returns to ground through an artificial line having a resistance substantially equal to the resistance of the communication line, the impedance of the primary balancing inductor at the frequency of the transmitter being no more than ⅓ the artificial line resistance, and a second inductor having a mutual inductance substantially equal to the inductance of the primary balancing inductor, the second inductor being so connected between the ungrounded receiver lead and the juncture of the phasing capacitor with the artificial line that voltage induced in the second inductor by transmitter current in the primary balancing inductor opposes voltage developed across the artificial line by current flow through the phasing capacitor.

2. The invention of claim 1 in which the second inductor is electrostatically screened from the first by a screen, said screen being electrically connected to the junction of leads to the artificial line, the phasing capacitor and the second inductor.

3. The invention of claim 1 in which the second inductor is connected to the ungrounded receiver lead through a capacitance that offsets the leakage reactance of the second inductor, said capacitance at or approaching resonance with said leakage inductance whereby received signal is increased.

4. The invention of claim 1 in which the second inductor is electrostatically screened from the first and is connected to the ungrounded receiver lead through a capacitance that offsets the leakage reactance of the second inductor, said capacitance at or approaching resonance with said leakage inductance whereby received signal is increased.

References Cited in the file of this patent

UNITED STATES PATENTS

| | | |
|---|---|---|
| 1,140,946 | Brown | May 25, 1915 |
| 1,432,354 | Nottage | Oct. 17, 1922 |
| 1,496,155 | Fransson | June 3, 1924 |
| 1,526,308 | Kloneck | Feb. 10, 1925 |
| 1,697,943 | Wurst | Jan. 8, 1929 |
| 1,817,294 | Cutting et al. | Aug. 4, 1931 |
| 2,204,721 | Blumlein | June 18, 1940 |
| 2,244,001 | Colchester | June 3, 1941 |
| 2,507,915 | Lindenblad | May 16, 1950 |
| 2,725,532 | Radcliffe | Nov. 29, 1955 |